US006970824B2

(12) United States Patent
Hinde et al.

(10) Patent No.: US 6,970,824 B2
(45) Date of Patent: Nov. 29, 2005

(54) ENABLING VOICE CONTROL OF VOICE-CONTROLLED APPARATUS USING A HEAD MOUNTED CAMERA SYSTEM

(75) Inventors: Stephen John Hinde, Bristol (GB); Timothy Alan Heath Wilkinson, Bristol (GB); Stephen B Pollard, Nr.Dursely (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 10/005,378

(22) Filed: Dec. 4, 2001

(65) Prior Publication Data

US 2002/0105575 A1    Aug. 8, 2002

(30) Foreign Application Priority Data

Dec. 5, 2000  (GB) .................................. 0029571
Mar. 12, 2001 (GB) .................................. 0105949

(51) Int. Cl.$^7$ ...................... G10L 21/00; G06K 9/00; G06K 9/46
(52) U.S. Cl. ................... 704/270.1; 704/275; 382/190; 382/103
(58) Field of Search ........................ 704/270.1, 275, 704/273; 382/190, 103

(56) References Cited

U.S. PATENT DOCUMENTS

| | | | | |
|---|---|---|---|---|
| 5,086,385 A | * | 2/1992 | Launey et al. ............... 700/83 |
| 5,637,849 A | | 6/1997 | Wang et al. ................. 235/454 |
| 5,677,834 A | | 10/1997 | Mooneyham ............... 364/188 |
| 5,682,030 A | * | 10/1997 | Kubon .................. 235/462.25 |
| 5,867,817 A | * | 2/1999 | Catallo et al. .............. 704/255 |
| 5,991,726 A | | 11/1999 | Immarco et al. ............ 704/270 |
| 6,012,102 A | * | 1/2000 | Shachar ......................... 710/5 |
| 6,111,580 A | | 8/2000 | Kazama et al. ............. 345/358 |
| 6,230,138 B1 | * | 5/2001 | Everhart ..................... 704/275 |
| 6,243,683 B1 | | 6/2001 | Peters ........................ 704/273 |
| 6,629,642 B1 | * | 10/2003 | Swartz et al. .......... 235/462.46 |
| 6,754,373 B1 | * | 6/2004 | de Cuetos et al. .......... 382/118 |
| 6,795,806 B1 | * | 9/2004 | Lewis et al. ................ 704/260 |

FOREIGN PATENT DOCUMENTS

| | | |
|---|---|---|
| EP | 0 591 044 A1 | 4/1994 |
| EP | 0 718 823 A2 | 6/1996 |
| EP | 1 056 036 A2 | 11/2000 |
| GB | 2 237 410 | 5/1991 |
| GB | 2 326 490 | 12/1998 |
| WO | 00/41065 | 7/2000 |

OTHER PUBLICATIONS

Rowley, H.A., et al., "Human Face Detection in Visual Scenes," *Carnegie Mellon Computer Science Technical Report CMU-CS-95-158R*, 26 pages (Nov. 1995).

(Continued)

*Primary Examiner*—W. R. Young
*Assistant Examiner*—Brian Albertalli

(57) ABSTRACT

Voice-controlled apparatus is provided which minimises the risk of activating more than one such apparatus at a time where multiple voice-controlled apparatus exist in close proximity. To start voice control of the apparatus, a user needs to be looking at the apparatus when speaking. Preferably, after the user stops looking at the apparatus, continuing voice control can only be effected whilst the user continues speaking without breaks longer than a predetermined duration. Detection of whether the user is looking at the apparatus can be effected in a number of ways including by the use of camera systems, by a head-mounted directional transmitter, and by detecting the location and direction of facing of the user.

20 Claims, 3 Drawing Sheets

OTHER PUBLICATIONS

Heinzmann, J. and A. Zelinsky, "3-D Facial Pose and Gaze Point Estimation using a Robust Real-Time Tracking Paradigm," *IEEE International Conference on Automatic Face & Gesture Recognition*, Nara, Japan, 6 pages (Apr. 1998).

Pappu, R. and P.A. Beardsley, "A Qualitative Approach to Classifying Gaze Direction," *IEEE International Conference on Automatic Face & Gesture Recognition*, Nara, Japan, 6 pages (Apr. 1998).

Newman, R., et al., "Real-Time Stereo Tracking for Head Pose and Gaze Estimation," *IEEE International Conference on Automatic Face & Gesture Recognition*, Grenoble, France, pp. 122-128 (Mar. 2000).

Moghaddam, B., et al., "Beyond Eigenfaces: Probabilistic Matching for Face Recognition," *IEEE International Conference on Automatic Face & Gesture Recognition*, Nara, Japan, 6 pages (Apr. 1998).

Moghaddam, B. and A. Pentland, "Probabilistic Visual Learning for Object Representation," *IEEE Transactions on Pattern Ananlysis and Machine Intelligence*, vol. 19, No. 7, pp. 696-710 (Jul. 1997).

Moghaddam, B., et al., "A Bayesian Similarity Measure for Direct Image Matching," *IEEE International Conference on Pattern Recognition*, Vienna, Austria, pp. 350-358 (Aug. 1996).

Moghaddam, B., et al., "Bayesian Face Recognition using Deformable Intensity Surfaces," *IEEE Conference on Computer Vision & Pattern Recognition*, San Francisco, CA, 7 pages (Jun. 1996).

Darrell, T., et al., "Active Face Tracking and Pose Estimation in an Interactive Room," *IEEE Conference on Computer Vision & Pattern Recognition*, San Francisco, Ca, 16 pages (Jun. 1996).

Nastar, C., et al., "Generalized Image Matching: Statistical Learning of Physically-Based Deformations," *Fourth European Conference on Computer Vision*, Cambridge, UK, 6 pages (Apr. 1996).

Moghaddam, B. and A. Pentland, "Probabilistic Visual Learning for Object Detection," *Fifth International Conference on Computer Vision*, Cambridge, MA, 8 pages (Jun. 1995).

Moghaddam, B. and A. Pentland, "A Subspace Method for Maximum Likelihood Target Detection," *IEEE International Conference on Image Processing*, Washington D.C., 4 pages (Oct. 1995).

Moghaddam, B. and A. Pentland, "An Automatic System for Model-Based Coding of Faces," *IEEE Data Compression Conference*, Snowbird, Utah, 5 pages (Mar. 1995).

Pentland, A., et al., "View-Based and Modular Eigenspaces for Face Recognition," *IEEE Conference on Computer Vision & Pattern Recognition*, Seattle, WA, 7 pages (Jul. 1994).

Okubo, M. and T. Watanabe, "Lip Motion Capture and Its Application to 3-D Molding," *IEEE International Conference on Automatic Face and Gesture Recognition*, Nara, Japan, pp. 187-192 (Apr. 1998).

Luthon, F. and M. Lievin, "Lip Motion Automatic Detection," *Tenth Scandinavian Conference on Image Analysis*, Lappeenratra, Finland, 3 pages (Jun. 1997).

Grant, K.W. and P. -F.. Seitz, "The use of visible speech cues for improving auditory detection of spoken sentences," *Journal of the Acoustical Society of America*, vol. 108, No. 3, pp. 1197-1208 (Sep. 2000).

Merchant, S. and T. Schnell, "Applying Eye Tracking as an Alternative Approach for Activation of Controls and Functions in Aircraft," *IEEE 19th Digital Avionics Systems Conference*, vol. 2, pp. 5.A.5/1-9 (Oct. 2000).

Myers, D.R., et al., "Robust Video Object Recognition and Pose Determination Using Passive Target Labels", *Cooperative Intelligent Robotics in Space III*, SPIE vol. 1829, pp. 2-12 (1992).

* cited by examiner

ENABLING VOICE CONTROL OF VOICE-CONTROLLED APPARATUS USING A HEAD MOUNTED CAMERA SYSTEM

FIELD OF THE INVENTION

The present invention relates to the enabling of voice control of voice-controlled apparatus.

BACKGROUND OF THE INVENTION

Voice control of apparatus is becoming more common and there are now well developed technologies for speech recognition particularly in contexts that only require small vocabularies.

However, a problem exists where there are multiple voice-controlled apparatus in close proximity since their vocabularies are likely to overlap giving rise to the possibility of several different pieces of apparatus responding to the same voice command.

It is known from U.S. Pat. No. 5,991,726 to provide a proximity sensor on a piece of voice-controlled industrial machinery or equipment. Activation of the machinery or equipment by voice can only be effected if a person is standing nearby. However, pieces of industrial machinery or equipment of the type being considered are generally not closely packed so that whilst the proximity sensor has the effect of making voice control specific to the item concerned in that context, the same would not be true for voice controlled kitchen appliances as in the latter case the detection zones of the proximity sensors are likely to overlap.

One way of overcoming the problem of voice control activating multiple pieces of apparatus, is to require each voice command to be immediately preceded by speaking the name of the specific apparatus it is wished to control so that only that apparatus takes notice of the following command. This approach is not, however, user friendly and users frequently forget to follow such a command protocol, particularly when in a hurry.

It is an object of the present invention to provide a more user-friendly way of minimising the risk of unwanted activation of multiple voice-controlled apparatus by the same verbal command.

SUMMARY OF THE INVENTION

According to one aspect of the present invention, there is provided a method of enabling voice control of voice-controlled apparatus, involving at least:
  (a) detecting when the user is looking towards the apparatus; and
  (b) initially enabling the apparatus for voice control only when the user is detected in (a) as looking towards the apparatus.

According to another aspect of the present invention, there is provided an arrangement for enabling voice control of voice-controlled apparatus, comprising:
  detection means for detecting when the user is looking towards the apparatus; and
  enablement control means for initially enabling the apparatus for voice control only if the detection means indicate that the user is looking towards the apparatus.

BRIEF DESCRIPTION OF THE DRAWINGS

A method and arrangement embodying the invention, for enabling voice control of voice-controlled devices, will now be described, by way of non-limiting example, with reference to the accompanying diagrammatic drawings, in which.

BEST MODE OF CARRYING OUT THE INVENTION

Figure 1:
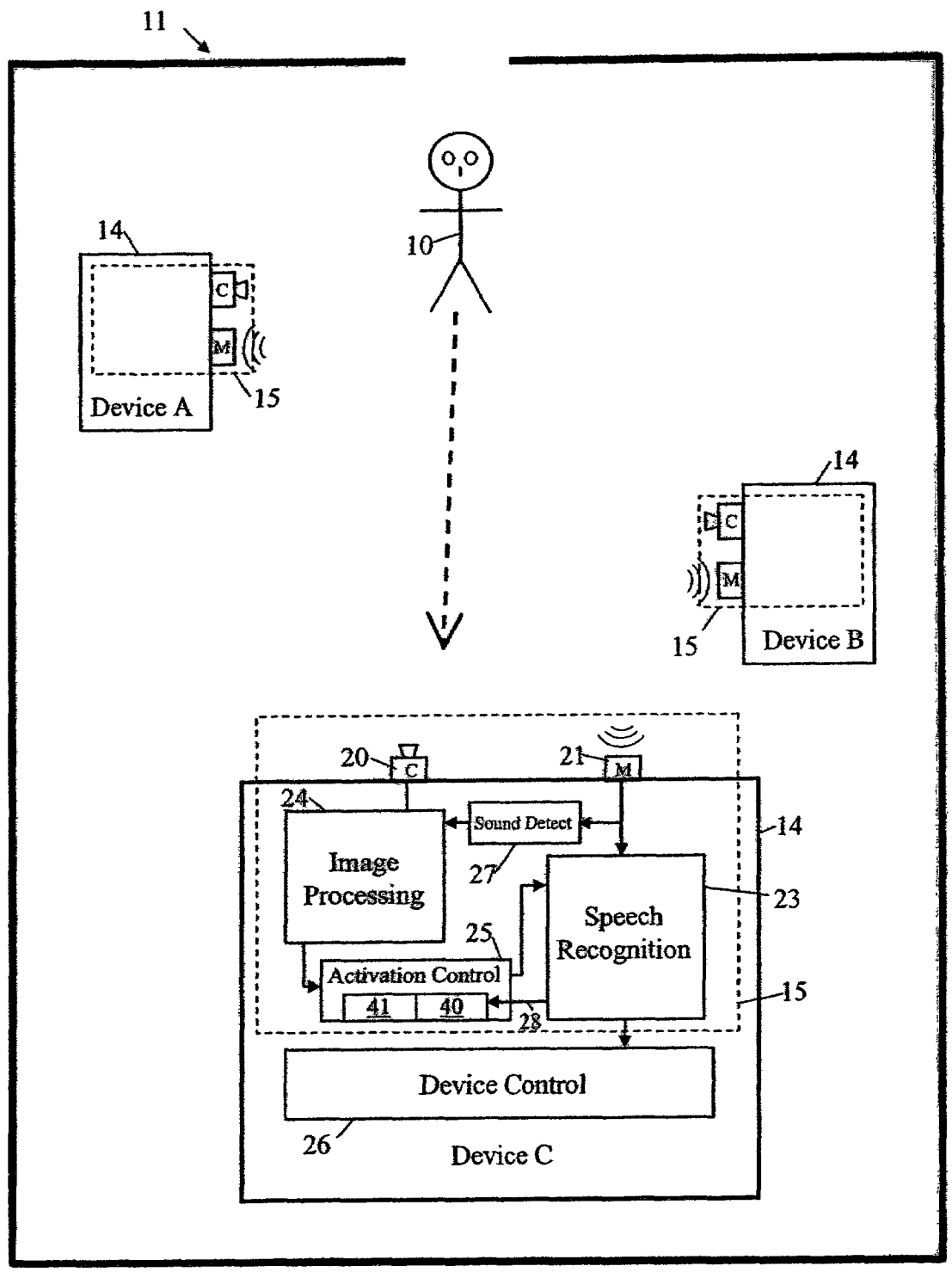
FIG. 1 is a diagram illustrating a room equipped with camera-equipped voice-controlled devices.

FIG. 1 shows a work space 11 in which a user 10 is present. Within the space 11 are three voice-controlled devices 14 (hereinafter referred to as devices A, B and C respectively) each with different functionality but each provided with a similar user interface subsystem 15 permitting voice control of the device by the user.

More particularly, and with reference to device C, the user-interface subsystem comprises:
  a camera 20 feeding an image processing unit 24 that, when enabled, is operative to analyse the image provided by the camera to detect any human face in the image and determine whether the face image is a full frontal image indicating that the user is looking towards the camera and thus towards the device C. The visibility of both eyes can be used to determine whether the face image is a frontal one. A general face detector is described in reference [1] (see end of the present description). More refined systems that can be used to determine whether an individual is looking at the device concerned by means of gaze recognition are described in references [2] to [4]. It may also be useful to seek to recognize the face viewed in order to be able to implement identity-based access control to the devices 14. Numerous face identification and recognition research systems exist such the MIT face recognition system developed by the Vision and modeling group of the MIT Media Lab; further examples of existing systems which are able to identify a face from an image are given in references [5] to [14].
  a microphone 21 feeding a speech recognition unit 23 which, when enabled, is operative to recognise a small vocabulary of command words associated with the device and output corresponding command signals to a control block 26 for controlling the main functionality of the device itself (the control block can also receive input from other types of input controls such as mechanical switches so as to provide an alternative to the voice-controlled interface 15).
  a sound-detection unit 27 fed by microphone 21 which triggers activation of the image processing unit upon detecting a sound (this need not be a speech sound).

Once triggered, the image processing unit will initiate and complete an analyse of the current image from camera 20.
  an activation control block 25 controlling activation of the speech recognition unit 23 in dependence on the output of the image processing unit 24; in particular, when the image processing unit indicates that the user is looking at the device, the block 18 enables the speech recognition unit.

Since the image processing unit 24 will take a finite time to analyse the camera image, a corresponding duration of the most recent output from the microphone is buffered so that what a user says when first looking towards the device is available to the speech recogniser when the latter is enabled as a consequence of the image processing unit producing a delayed indication that the user is looking towards the device. An alternative approach is to have the image processing unit operating continually (that is, the element 27 is omitted) with the most recent image analysis always being used as input to the activation control.

If the user 10 just speaks without looking towards device C, the activation control block 25 keeps the speech recogniser 23 in an inhibited state and the latter therefore produces no output to the device control block 26. However, upon the user looking towards the camera 20 the image processing unit detects this and provides a corresponding indication to the activation control block 25. As a consequence, block 25 enables the speech recognition unit to receive and interpret voice commands from the user. This initial enablement only exists whilst the image processing unit 24 continues to indicate that the user is looking towards the device. Only if the user speaks during this initial enablement phase does the activation control block 25 continue to enable the speech recognition unit 23 after the user looks away. For this purpose (and as indicated by arrow 28 in FIG. 1), the block 25 is fed with an output from the speech recogniser that simply indicates whether or not the user is speaking. A delayed-disablement block 40 of control block 25 is activated if the output 28 indicates that the user is speaking during the initial enablement phase (that is, when the user is detected as looking at the apparatus). The delayed-disablement block 40 when activated ensures that the speech recognition unit 23 continues to be enabled, after the user looks away from the apparatus, but only whilst the user continues speaking and for a limited further period timed by timer 41 (and, for example, of 5 seconds duration) in case the user wishes to speak again to the device. If the user starts talking again in this period, the speech recogniser interprets the input and also indicates to block 25 that the user is speaking again; in this case, block 40 continues its enablement of unit 23 and resets timing out of the aforesaid limited period of silence allowed following speech cessation.

Since there may be several people in the space 11 any of whom may start talking in the limited timeout period, the speech recognition block 23 is preferably arranged to characterise the voice speaking during initial enablement of the apparatus and then to check that any voice detected during the timeout period has the same characteristics (that is, is the same person)—if this check fails, that voice input is ignored. This voice characteristic check is preferably also applied to the voice input after the user turns away whilst speaking.

In this manner, the user can easily ensure that only one device at a time is responsive to voice control.

Since a single camera has only a limited field of vision, various measures can be taken to increase the visual coverage provided. For example, the camera can be fitted with a wide-angle lens or with a scanning apparatus, or multiple cameras can be provided.

As already indicated, access to the device C can be made dependent on the identity of the user by having the image processing block also carry out face recognition against a stored library of images of authorised personnel; with this arrangement, the processing block 24 only generates an output to activation control block 25 if the viewed face is recognised. Other forms of user recognition can be used alternatively, or additionally, to face recognition. For example, the user could be identified by speaking a code word or by voice feature recognition (typically, these checks would be carried out by block 23 when activated).

It is, of course, possible that several people are facing the same device with not all of them being authorised to use the device. Whilst it may be advantageous in some situations to permit device usage by anyone whenever an authorised user is present, in other situations this may not be desired. In such situations, the user interface subsystem 15 is preferably arranged to recognise which of the persons facing the device is actually talking and only enable device utilisation if that person is authorised. One way in which this can be done is to check if the voice heard has characteristics corresponding to the pre-stored characteristics of the authorised person or persons viewed. Another possibility is to have the image processing block 24 seek to detect lip movement on the face of persons recognised as authorised. Suitable detection arrangements are described in references [15] and [16].

Figure 2:
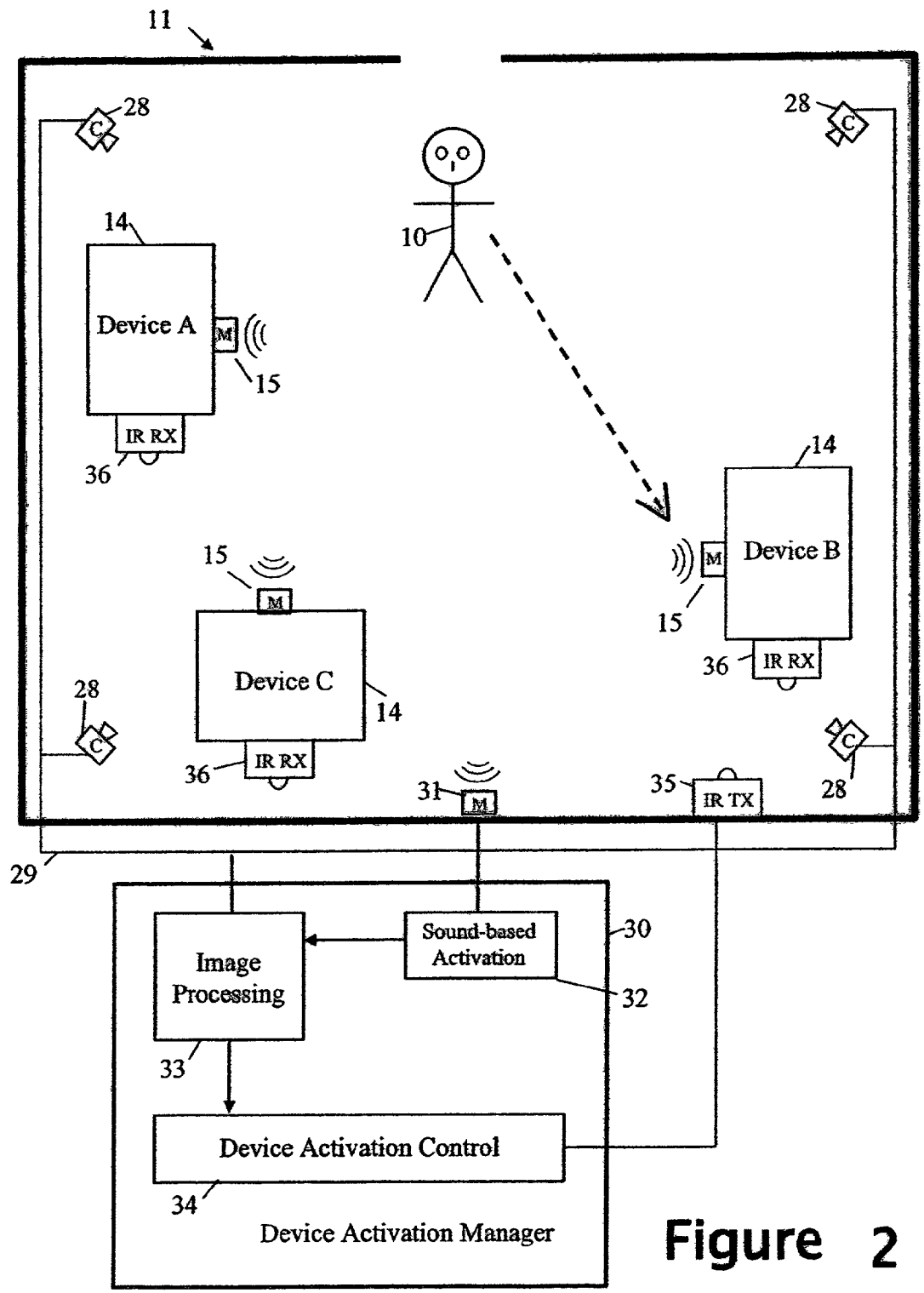
FIG. 2 is a diagram illustrating a camera-equipped room for controlling activation of voice-controlled devices in the room.

In fact, the detection of lip movement by a user facing the device is advantageously made a condition of initial enablement of the device (independently of any user identity requirements) since even with only one person facing the device, the voice of another person may be picked up by the voice recogniser block 23 and trigger operation of the apparatus FIG. 2 shows another embodiment which whilst operating in the same general manner as the FIG. 1 arrangement for effecting activation control of voice-controlled devices 14, utilises a set of four fixed room cameras 28 to determine when a user is looking at a particular device. These cameras feed image data via LAN 29 to a device activation manager 30 which incorporates an image processing unit 33 for determining when a user is looking at a particular device having regard to the direction of looking of the user and the user's position relative to the device positions. When the unit 33 determines that the user is looking at a device 14 it informs a control block 34 which is responsible for informing the device concerned via an infrared link established between an IR transmitter 35 of the manager and an IR receiver 36 of the device. The manager 30 has an associated microphone 31 which, via sound activation control block 37, causes the image processing unit to be activated only when a sound is heard in the room.

The devices themselves do not have a camera system or image processing means and rely on the manager 30 to inform them when they are being looked at by a user. Each device 14 does, however, include control functionality that initially only enables its speech recognition unit whilst the user is looking at the device as indicated by manager 30, and then provided the user speaks during this initial enablement, maintains enablement of the speech recogniser whilst the speaking continues and for a timeout period thereafter (as for the FIG. 1 embodiment) even if the user looks away from the device.

Figure 3:
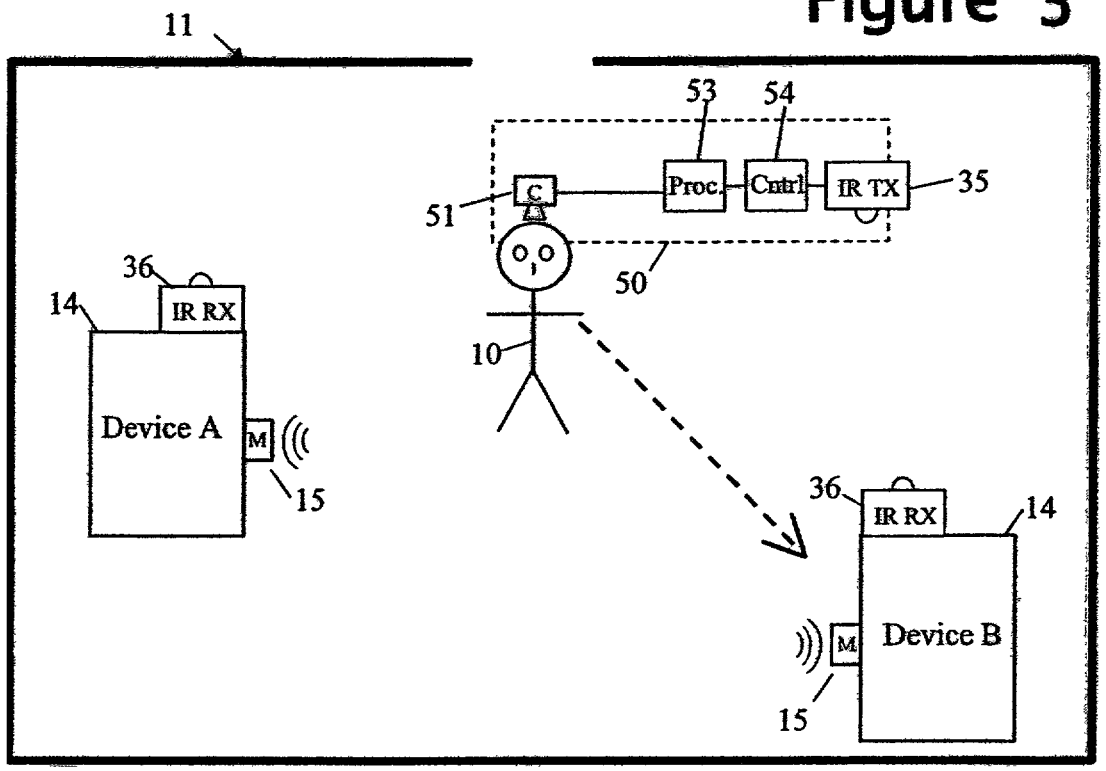
FIG. 3 is a diagram illustrating a room in which there is a user with a head-mounted camera arrangement for controlling activation of voice-controlled devices in the room.

FIG. 3 shows a further camera-based embodiment in which the voice-controlled devices 14 (only two shown) are of substantially the same form as in the FIG. 2 embodiment, but the camera system is now a camera 51 mounted on a head mounting carried by the user and facing directly forwards to show what the user is facing towards. This camera forms part of user-carried equipment 50 that further comprises an image processing unit 53, control block 54, and an infrared transmitter 35 for communicating with the devices 14 via their infrared receivers 36. The image from the camera 51 is fed to the image processing unit 53 where it is analysed to see if the user is facing towards a device 14. This analysis can be based simply on recognising the device itself or the recognition task can be facilitated by providing each device with a distinctive visual symbol, preferably well lit or, indeed, constituted by a distinctive optical or infrared signal. When the unit 53 determines that the user is facing a device it informs the control block 54 which is then responsible for notifying the corresponding device via the IR transmitter 35 (or other communications link). The distinctive visual symbol may identify the device in terms of its address on a communications network.

One possible form of distinctive symbol used to identify a device is a bar code and, preferably, a perspective invariant bar code. Such bar codes are already known. An example of a perspective invariant bar code uses a set of concentric black rings on a white background. The rings could be of two different thicknesses, to allow binary information to be coded in the ring thicknesses. The rings are reasonably viewpoint invariant because if the circles are viewed at an angle, ellipses will be perceived, which can be transformed by computer processing back to circles before decoding the binary information. Further information could be added by breaking (or not as the case may be) individual rings and by grouping rings.

Simple image processing can be used to find groups of concentric ellipses in an image. The image is first be processed to obtain a threshold for black/white boundaries in the image, then, connected component analysis is used to find connected groups of black pixels on a white background. Ellipses can then be fitted around the inner and outer edge of each component group of black pixels. Next, the ellipses can be transformed to circles and processing carried out to determine whether those circles share common centers and order the rings in terms of size. From there, a discrimination can be conducted between thick rings and thin rings. In order to achieve the latter, it will be necessary to have at least one thick and one thin ring in each pattern.

Figure 4:
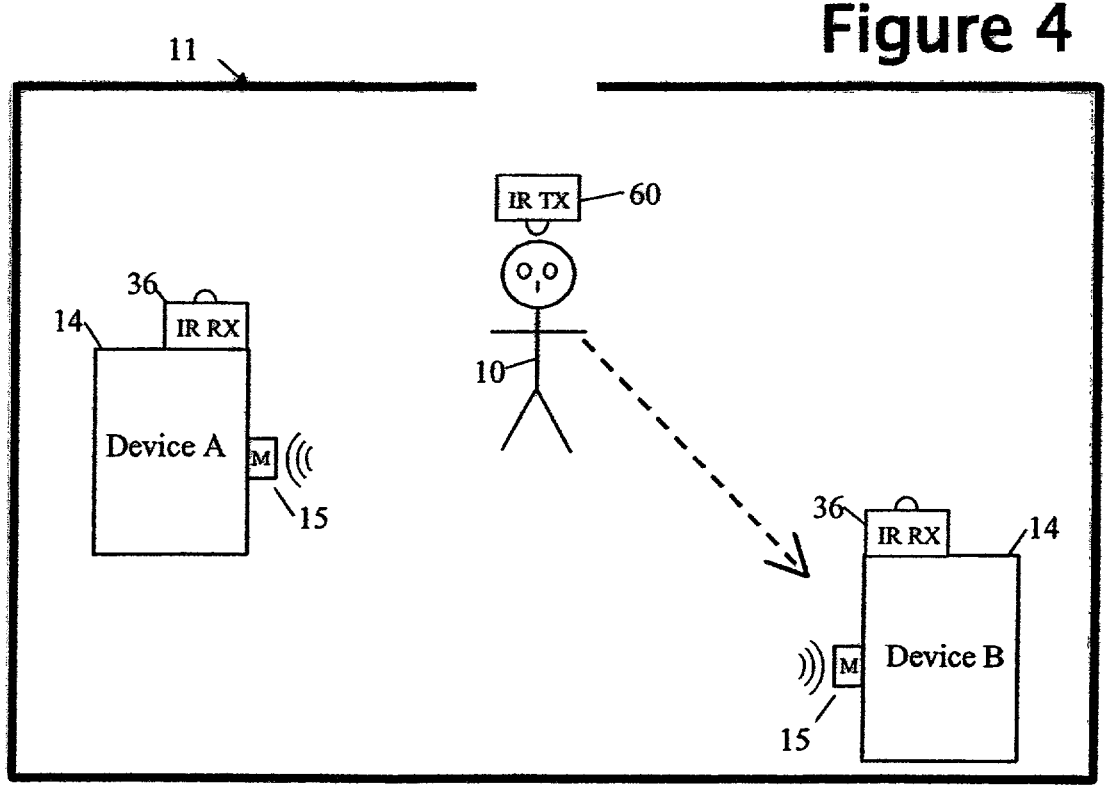
FIG. 4 is a diagram illustrating a room in which there is a user with a head-mounted infrared pointer for controlling activation of voice-controlled devices in the room.

FIG. 4 shows a simplified version of the FIG. 3 embodiment in which the user-carried camera and image processing unit are replaced by a directional transmitter (here shown as an IR transmitter 60) mounted on the user's head to point in the direction the user is facing. Now, whenever a device's IR receiver 36 picks up the transmissions from transmitter 60, it knows the user is facing towards the device. The IR transmitter 60 can be arranged to emit a modulated infra red beam, which modulation forms a binary code to particularly identify the wearer as a certain individual or a member of a group of individuals. A very high frequency radio (e.g. mmwave) transmitter or an ultrasound transmitter could be used instead.

Many other variants are, of course, possible to the arrangement described above. For example, even after its enablement, the speech recognizer of each device can be arranged to ignore voice input from the user unless, whilst the user is looking towards the apparatus, the user speaks a predetermined key word. In one implementation of this arrangement, after being enabled the speech recogniser is continually informed of when the user is looking towards the device and only provides an output when the key word is recognised (this output can either be in respect only of words spoken subsequent to the key words or can take account of all words spoken after enablement of the recogniser (the words spoken prior to the key word having been temporarily stored).

The determination of when a user is looking towards a device can be effected by detecting the position of the user in the space 11 by any suitable technology and using a direction sensor (for example, a magnetic flux compass or solid state gyroscope) mounted on a user's head for sensing the direction of facing of the user, the output of this sensor and the position of the user being passed to a processing unit which then determines whether the user is facing towards a device (in known positions).

REFERENCES

[1] Human Face Detection in Visual Scenes, Henry A. Rowley, Shumeet Baluja and Takeo Kanade, Carnegie Mellon Computer Science Technical Report CMU-CS-95-158R, November 1995.

[2] 3-D Facial Pose and Gaze Point Estimation using a Robust Real-Time Tracking Paradigm, Jochen Heinzmann & Alexander Zelinsk. *International Conference on Automatic Face & Gesture Recognition*, Nara, Japan, April 1998.

[3] A Qualitative Approach to Classifying Gaze Direction, Ravikanth Pappu, *International Conference on Automatic Face & Gesture Recognition*, Nara, Japan, April 1998.

[4] Real-Time Stereo Tracking for Head Pose and Gaze Estimation Rhys Newman, Yoshio Matsumoto, Sebastien Rougeaux, and Alexander Zelinsky, *International Conference on Automatic Face & Gesture Recognition*, Grenoble, France, March 2000.

[5] Beyond Eigenfaces: Probabilistic Matching for Face Recognition Moghaddam B., Wahid W. & Pentland A. International Conference on Automatic Face & Gesture Recognition, Nara, Japan, April 1998.

[6] Probabilistic Visual Learning for Object Representation Moghaddam B. & Pentland A. Pattern Analysis and Machine Intelligence, PAMI-19 (7), pp. 696–710, July 1997

[7] A Bayesian Similarity Measure for Direct Image Matching Moghaddam B., Nastar C. & Pentland A. International Conference on Pattern Recognition, Vienna, Austria, August 1996.

[8] Bayesian Face Recognition Using Deformable Intensity Surfaces Moghaddam B., Nastar C. & Pentland A. IEEE Conf. on Computer Vision & Pattern Recognition, San Francisco, Calif., June 1996.

[9] Active Face Tracking and Pose Estimation in an Interactive Room Darrell T., Moghaddam B. & Pentland A. IEEE Conf. on Computer Vision & Pattern Recognition, San Francisco, Calif., June 1996.

[10] Generalized Image Matching: Statistical Learning of Physically-Based Deformations Nastar C., Moghaddam B. & Pentland A. Fourth European Conference on Computer Vision, Cambridge, UK, April 1996.

[11] Probabilistic Visual Learning for Object Detection Moghaddam B. & Pentland A. International Conference on Computer Vision, Cambridge, Mass., June 1995.

[12] A Subspace Method for Maximum Likelihood Target Detection Moghaddam B. & Pentland A. International Conference on Image Processing, Washington D.C., October 1995.

[13] An Automatic System for Model-Based Coding of Faces Moghaddam B. & Pentland A. IEEE Data Compression Conference, Snowbird, Utah, March 1995.

[14] View-Based and Modular Eigenspaces for Face Recognition Pentland A., Moghaddam B. & Starner T. IEEE Conf. on Computer Vision & Pattern Recognition, Seattle, Wash., July 1994.

[15] Lip Motion Capture and Its Application to 3-D Molding, Masashi Okubo, Tomio Watanabe, *International Conference on Automatic Face & Gesture Recognition*, Nara, Japan, April 1998.

[16] Lip Motion Automatic Detection, Franck Luthon, & M. Liévin, 10<sup>th</sup> *Scandinavian Conference on Image Analysis*, Lappeenratra, Finland, June 1997.

What is claimed is:

1. A method of enabling voice control of an apparatus provided with a voice-control subsystem including a speech recognizer, the method comprising:
  (a) detecting when a user is looking towards the apparatus by using a camera system mounted on the user's head and arranged to point in the direction the user is facing or looking, images produced by the camera system being processed by an image processing subsystem to determine if the camera system is pointing towards the apparatus; and
  (b) initially enabling voice control of the apparatus by its voice-control subsystem only when the user is detected in step (a) as looking towards the apparatus.

2. A method according to claim 1, wherein the apparatus only remains enabled for voice control whilst the user continues to be detected in (a) as looking towards the apparatus.

3. A method according to claim 1, further involving:
  detecting when the user is speaking, and
  where the user is detected as speaking whilst the apparatus is initially enabled for voice control, continuing enablement of the apparatus for voice control following the user ceasing to look towards the apparatus but only whilst the user continues speaking and for a timeout period thereafter, recommencement of speaking by the user during this timeout period continuing enablement of voice control with timing of the timeout period being reset.

4. A method according to claim 1, further involving:
  detecting when the user is speaking and determining characteristics of the user's voice;
  where the user is detected as speaking whilst the apparatus is initially enabled for voice control, continuing enablement of the apparatus for voice control following the user ceasing to look towards the apparatus but only in respect of a voice having the same characteristics as that of the voice detected whilst the apparatus was initially enabled, and only whilst that voice continues speaking and for a timeout period thereafter, recommencement of speaking by the same voice during this timeout period continuing enablement of voice control with timing of the timeout period being reset.

5. A method according to claim 1, wherein the apparatus carries an identifying mark that is used to identify the apparatus to the image processing subsystem.

6. A method according to claim 5, wherein the identifying mark takes the form of a perspective invariant bar code.

7. A method according to claim 5, wherein the identifying mark takes the form of an encoded optical or infrared signal.

8. A method according to claim 5, wherein the identifying mark encodes a communications address at which the apparatus can be contacted.

9. A method according to claim 1 applied in an environment including multiple apparatus's each with its own voice-control subsystem, step b) including communicating enablement signals to the apparatus determined in step a) as being looked towards by the user.

10. A method according to claim 1, wherein step a) is carried out by equipment carried by the user, step b) including the sending of enablement signals from this equipment to the apparatus to be initially enabled.

11. An arrangement for enabling voice control of an apparatus provided with a voice-control subsystem including a speech recognizer, the arrangement comprising:
  detection means for detecting when the user is looking towards the apparatus, the detection means comprising:
    a camera system mounted on a user's head and arranged to point in the direction the user is facing or looking, and
    image processing means for processing images produced by the camera system to determine if the camera system is pointing towards the apparatus; and
  enablement control means for initially enabling voice control of the apparatus by its voice-control subsystem only if the detection means indicate that the user is looking towards the apparatus.

12. An arrangement according to claim 11, wherein the control means is operative to keep the apparatus enabled for voice control only whilst the detection means continues to detect the user looking towards the apparatus.

13. An arrangement according to claim 11, further comprising a speaking detector for detecting when a user is speaking, the control means comprising:
  initial-enablement means for effecting the said initial enabling of the apparatus for voice control;
  delayed-disablement means including timing means for timing a timeout period; and
  means for activating the delayed-disablement means upon the speaking detector detecting a user speaking whilst the apparatus is initially enabled by the initial-enablement means;
  the delayed-disablement means, when activated, being operative to keep the apparatus enabled for voice control following the detection means ceasing to detect that the user is looking towards the apparatus but only whilst the speaking detector continues to detect that the user is speaking and for the duration thereafter of the said timeout period as timed by the timing means, the delayed-disablement means being responsive to the speaking detector detecting recommencement of speaking by the user during this timeout period to reset timing of the timeout period.

14. An arrangement according to claim 11, further comprising a speaking detector for detecting when a user is speaking, and a voice analyzer for determining characteristics of the user's voice, the control means comprising:
  initial-enablement means for effecting the said initial enabling of the apparatus for voice control;
  delayed-disablement means including timing means for timing a timeout period; and
  means for activating the delayed-disablement means upon the speaking detector detecting a user speaking whilst the apparatus is initially enabled by the initial-enablement means;
  the delayed-disablement means, when activated, being operative to keep the apparatus enabled for voice control following the detection means ceasing to detect that the user is looking towards the apparatus but only:
    in respect of a voice having the same characteristics, as determined by the voice analyzer, as that of the detected voice giving rise to activation of the delayed disablement means; and
    whilst the voice continues without a break greater than said timeout period as timed by the timing means.

15. An arrangement according to claim 11, wherein the image processing means is operative to recognize identifying marks of a predetermined type carried by the apparatus.

16. An arrangement according to claim 15, wherein the said predetermined type of identifying mark is an invariant bar code.

17. An arrangement according to claim 15, wherein the said predetermined type of identifying mark is an encoded optical or infrared signal.

18. An arrangement according to claim 11, wherein the said predetermined type of identifying mark is an encoded communications address at which the apparatus can be contacted.

19. An arrangement according to claim 8, wherein the detection means is incorporated in equipment intended to be carried by the user, and the enablement control means comprises:

a communications subsystem for sending enablement signals from this equipment to the apparatus, and control functionality at the apparatus which is responsive to the receipt of said enablement signals at the apparatus to enable the apparatus for voice control by the voice control subsystem.

20. An installation accommodating at least one said apparatus, the installation including an arrangement according to claim 19.

* * * * *